UNITED STATES PATENT OFFICE.

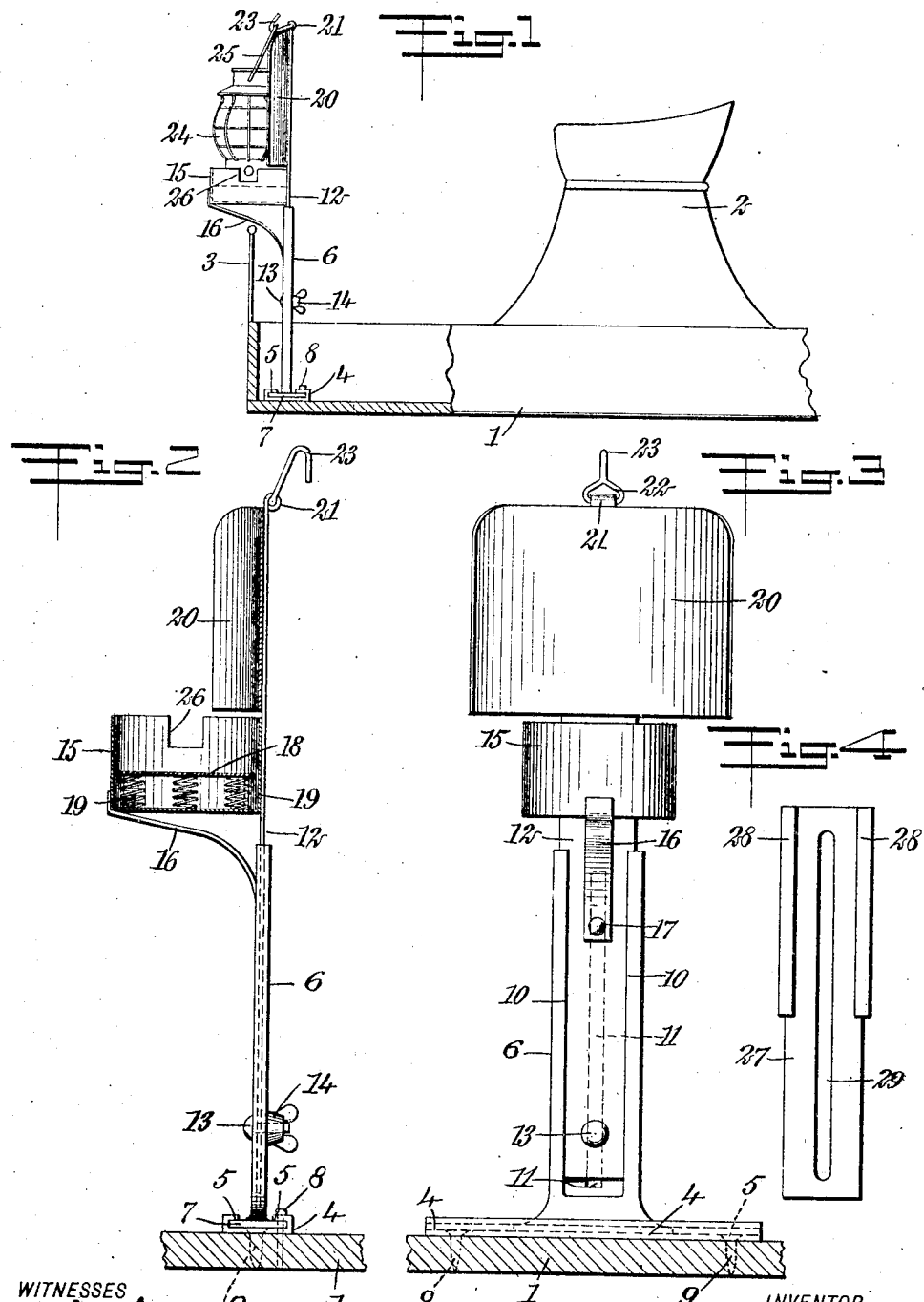

CHESTER W. LEANING, OF YANKTON, SOUTH DAKOTA.

LANTERN-HOLDER.

No. 882,396.      Specification of Letters Patent.      Patented March 17, 1908.

Application filed June 6, 1907. Serial No. 377,583.

*To all whom it may concern:*

Be it known that I, CHESTER W. LEANING, a citizen of the United States, and a resident of Yankton, in the county of Yankton and State of South Dakota, have invented a new and Improved Lantern-Holder, of which the following is a full, clear, and exact description.

This invention relates to lantern-holders, and more particularly that class of lantern holders used in connection with road vehicles.

The object of the invention is to provide a simple, strong and inexpensive lantern holder, having means for supporting a lantern and adjustable both vertically and laterally.

A further object of the invention is to provide a lantern holder having efficient means for resiliently supporting a lantern, and adapted to be removably mounted upon a vehicle body, the holder being adjustable laterally and vertically to enable the lantern to be held in the most advantageous position according to circumstances.

A still further object of the invention is to provide a device of the class described, having a reflector which prevents the rays of light from the lamp from blinding the eyes of the occupants of the vehicle, while at the same time throwing the light from the lamp in the direction of travel.

The invention consists in the construction and combination of parts to be more particularly described hereinafter and fully set forth in the claims.

Reference is to be had to the accompanying drawings forming a part of this specification, in which similar characters of reference indicate corresponding parts in all the views, and in which Figure 1 is a side elevation of a vehicle body showing my device attached thereto, the vehicle body being partly broken away; Fig. 2 is a side elevation showing parts of the invention in vertical section; Fig. 3 is a front elevation of my lantern holder; and Fig. 4 is an elevation of a detail.

Referring more particularly to the drawings, 1 represents the body of a vehicle, such for instance, as a buggy or road-wagon, having a seat 2 and a dash-board 3. It should be understood that my lantern holder is applicable to all types of vehicles and will be found of equal value and efficiency in connection with practically all. Rigidly secured upon the bottom of the vehicle body near the front end or dash-board is an elongated socket 4 of any suitable material, but constructed preferably of cast-iron. The socket 4 has a recess, extending the entire length thereof, presenting opposite under-cut grooves 5. The ends of the recess are open and permit the placing in position in the recess of a foot 7 of an upright 6; the upright 6 together with a member slidably carried thereby, constitutes a standard for the lantern holder. The upright 6 has at the lower end laterally extended integral flanges forming the foot 7. The foot 7 can slide freely within the recess of the socket 4, engaging the under-cut grooves 5, and being held in position thereby. A pin 8 having a suitable head, serves to hold the upright 6 in position within the socket 4, the pin being inserted in suitable registered openings in the socket and the foot of the upright.

The socket is secured in position upon the wagon body, preferably by means of screws or bolts 9. The upright 6 has an elongated recess presenting under-cut sides 10 at the opposite sides, similar to those of the recess of the socket 4. The upright has an elongated slot at the back between the sides of the recess. A flat member or plate 12 is slidably arranged in the recess of the upright and is held in position therein by the under-cut sides 10 which engage the edges of the member. The member 12 has a screw-pin 13 loosely mounted in a suitable opening, the end of the pin projecting through the slot 11. A thumb-screw or wing-nut 14 is mounted upon the projecting end of the screw-pin 13 at the back of the upright and serves to clamp the member 12 in position in the upright.

Above the upright 6, the member 12 carries a support 15, consisting preferably of a cylindrical member of sheet-metal or the like. The upright 6 and the member 12 are preferably formed of cast-iron. A brace 16 is secured to the support 15 at one end and at the other end by means of a rivet 17, to the member 12. The support 15 has at the bottom, a base-plate 18 resiliently carried on a plurality of helical springs 19. A reflector 20 is mounted upon the upper end of the member 12 above the support 15, and has the sides outwardly curved as is shown most clearly in Figs. 1 and 2. The extreme upper end of the member 12 is formed into a loop or sleeve 21 in which is loosely mounted the eye 22 of a hook 23. The lantern 24 which may be of any common or preferred type, is carried within the support 15, resting upon the resiliently-carried base-plate 18 and having a handle 25 engaged by the hook 23. At the sides, the support 15 is cut away to form openings 26, through which the wick-regulator or other attachments of the lamp can be easily manipulated.

The socket 4 is the only part of the device which is rigidly secured to the vehicle body. When a lantern is not required, the upright 6 can be removed from the socket and together with the member 12 and the supporting means for the lamp, can be packed away in any convenient place, such as the box under the seat of the vehicle. In this way when the frame is not needed the holder can be removed and thus is no longer in the way. The elevation of the lantern can be adjusted by sliding the member 12 up or down within the upright 6 and clamping it in a desired position by means of the thumb-nut 14. Similarly, the lantern may be adjusted laterally, a plurality of openings being preferably provided for the pin 8. As the base-plate 18 is resiliently mounted, the jar incident to the movement of the vehicle over a rough road will not be liable to extinguish the flame of the lamp. Similarly, the height of the walls of the support 15 and the engagement of the hook 23 with the lamp handle, prevents the accidental displacement of the lamp from the holder. The arrangement of the reflector is such that the rays of light from the lamp are thrown forward thereby, and thus do not shine directly in the eyes of the occupants of the vehicle.

In case it is desired to hold the lantern at a considerable elevation, use may be made of an extension member 27 which is provided for the purpose. The extension member 27 has flanges 28 at the opposite sides near the upper end which form, with the member 27, a recess having grooves at the sides. In the recess of the member 27 the member 12 can be mounted, a slot 29 being provided for the purpose. The lower end of the member 27 may be inserted in the recess of the upright 6 and can be clamped in position by means of screw and thumb-nuts extending through the slot 29 and the slot 11 of the upright.

Having thus described my invention, I claim as new and desire to secure by Letters Patent:—

1. A lantern holder comprising a socket having an elongated recess, an upright having a laterally disposed foot removably arranged in said recess and engaging the sides thereof, said upright having an elongated recess presenting a slot, a member removably arranged in said recess of said upright engaging the sides thereof and having a projection extending through said slot, means upon said projection for holding said member in position, a support carried by said member, a base-plate arranged on said support and resiliently held thereupon, said base-plate serving to carry a lantern, said member having a loop, and a hook having an eye loosely mounted in said loop, said hook serving to engage the lantern.

2. A lantern holder, comprising a socket having an elongated recess presenting under-cut sides, an upright having a laterally disposed foot removably arranged in said recess and engaging said under-cut sides, said upright having an elongated recess presenting under-cut sides and a slot, a member removably arranged in said recess of said upright engaging said under-cut sides and having a screw-pin projecting through said slot, a thumb-nut upon said screw-pin and adapted to hold said member in position, a support carried by said member, a base-plate arranged on said support and resiliently held thereupon, said base-plate serving to carry a lantern, said member having a loop, and a hook having an eye loosely mounted in said loop, said hook serving to engage the lantern.

3. A lantern holder, comprising a socket having an elongated recess presenting under-cut sides, an upright having a laterally disposed foot removably arranged in said recess, engaging said under-cut sides, said upright having an elongated recess presenting under-cut sides and a slot, a member removably arranged in said recess of said upright, engaging said under-cut sides and having a screw-pin projecting through said recess, a thumb-nut upon said screw-pin and serving to clamp said member in position, a cylindrical support carried by said member, a base-plate in said support, a helical spring between said base-plate and the bottom of said support, said base-plate serving to carry a lantern, a reflector having outwardly-disposed curved sides carried by said member above said support, said member having a loop, and a hook having an eye loosely mounted in said loop, said hook serving to engage the lantern, said support having cut-away portions at the sides.

In testimony whereof I have signed my name to this specification in the presence of two subscribing witnesses.

CHESTER W. LEANING.

Witnesses:
B. S. WILLIAMS,
G. W. FROSTENSON.